United States Patent Office 3,631,036
Patented Dec. 28, 1971

3,631,036
5-AMINO-2,6-SUBSTITUTED-7H-PYRROLO[2,3-d]
PYRIMIDINES AND RELATED COMPOUNDS
Dong H. Kim, Wayne, and Arthur A. Santilli, Havertown, Pa., assignors to American Home Products Corporation, New York, N.Y.
No Drawing. Filed Nov. 4, 1969, Ser. No. 874,052
Int. Cl. C07d 57/14
U.S. Cl. 260—247.2 A          8 Claims

ABSTRACT OF THE DISCLOSURE

The disclosure is directed to 5-amino-2,6-substituted-7H-pyrrolo[2,3-d]pyrimidines and related compounds and to 4-halo-5-pyrimidinecarbonitriles and their derivatives. The compounds have central nervous system activity as depressants. That is, they produce a calming effect in the host.

---

This invention relates to new and useful pyrimidine derivatives and pyrrolo[2,3-d]pyrimidine derivatives. More particularly, this invention relates to new and useful 2,5,6-trisubstituted-7H-pyrrolo[2,3-d]pyrimidine, to intermediates in their preparation: 4-hydroxy-5-pyrimidinecarboxylic acid, ethyl ester; 4-hydroxy-5-pyrimidinecarboxamide; 4-halo-5-pyrimidinecarbonitriles, and to derivatives of the former compounds: 5-amino-7H-pyrrolo[2,3-d]pyrimidine-6-carbonitrile; -5 - haloalkylamido-7H-pyrrolo[2,3-d]pyrimidine - 6 - carbonitrile; 5-(lower alkoxyalkyl-amino)lower alkylamido-7H-pyrrolo[2,3-d]pyrimidine-6-carbonitrile; N-(6-cyano-7H-pyrrolo[2,3-d]pyrimidine-5-yl)-4-cyclo(lower)alkyl(lower)alkylamide; and 5-(cyclo-(lower)alkylamido) - 7H - pyrrolo[2,3-d]pyrimidine-6-carboxamide.

The compounds within the purview of the present invention are exemplified by the compound 2,5,6-trisubstituted-7H-pyrrolo[2,3-d]pyrimidine having the following formula:

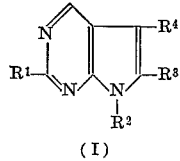

(I)

wherein:
R¹ is lower alkyl, phenyl, halophenyl, lower alkylphenyl, lower alkoxyphenyl, or lower alkylthio;
R² is hydrogen or lower alkyl;
R³ is cyano, carbamoyl, or lower alkoxycarbonyl; and
R⁴ is amino or NHR' where R' is chloro(lower)alkylcarbonyl, bromo(lower)alkylcarbonyl, lower alkoxyethylamino(lower)alkylcarbonyl, lower alkoxypropylamino(lower)alkylcarbonyl, lower alkoxybutylamino-(lower)alkylcarbonyl, morpholino(lower)alkylcarbonyl, cycloalkylcarbamoyl(lower)alkyl, lower alkyl and lower alkylamino.

As used herein the terms "lower alkyl," "lower alkoxy" and the like, describe straight and branched, saturated and unsaturated groups containing from 1 to about 4 carbon atoms, and "cycloalkyl" refers to saturated cyclic hydrocarbon groups having 4 to 10 carbons.

A typical example of the compounds of this invention which is depicted by structural Formula I is 5-amino-2-phenyl-7H-pyrrolo[2,3-d]pyrimidine - 6 - carboxylic acid, ethyl ester.

Also within the purview of the present invention are the 2,4,5-trisubstituted pyrimidines exemplified by the following formula which, as it is explained below, are intermediates in the preparation of the compounds having Formula I:

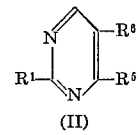

(II)

where:
R⁵ is hydroxyl, halo, and R²NCH₂R³, and where R¹, R² and R³ are as defined above, and
R⁶ is cyano.

A typical example of the compounds of this invention which is depicted by structural Formula II is (5-cyano-2-phenyl-4-pyrimidinylamino) acetic acid, ethyl ester.

The new and useful compounds of this invention may be prepared by the process which is hereinafter schematically illustrated:

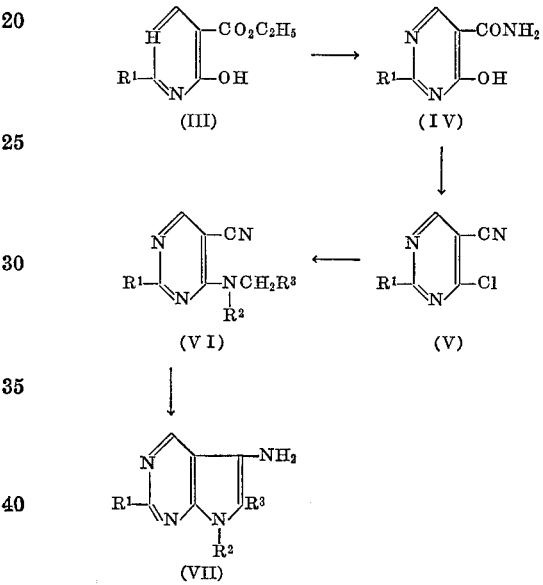

where R¹–R⁵ are as defined above.

The compound 2,5,6-trisubstituted-7H-pyrrolo[2,3-d] pyrimidines (I) of the present invention may be prepared from known starting materials in a four step process.

In the first step, a mixture of 4-hydroxy-5-pyrimidine-carboxylic acid, ethyl ester (III) and concentrated ammonium hydroxide are charged in a steel bomb and heated in a steam bath for about two to seven hours, preferably about four to five hours. The bomb is opened after being chilled, and the excess ammonia evaporated on a steam bath. Acidification of the concentrated solution with dilute mineral acid, such as hydrochloric acid, causes separation of a precipitate which may be collected on a filter and washed with water to produce the product 4-hydroxy-5-pyrimidinecarboxamide (IV) which may be purified by recrystallization from an aprotic solvent, such as N,N-dimethylformamide, dimethylsulfoxide and sulfolane.

In the second step, the product 4-hydroxy-5-pyrimidinecarboxamide and phosphorus oxychloride are refluxed for about one to six hours, preferably three to four hours and then the excess phosphorus oxychloride is removed under reduced pressure. The remaining traces of phosphorus oxychloride may be destroyed by adding crushed ice. The product is collected on a filter and washed with water several times. The product is recrystallized, for instance from absolute ethanol to obtain the product 4-halo-5-pyrimidinecarbonitrile (V).

In the third step, the product 4-halo-5-pyrimidine-carbonitrile (V) is added to a mixture of glycine ethyl ester hydrochloride, sodium carbonate and ethanol after refluxing for about ¼ to three hours preferably about ¾ of an hour. The mixture is refluxed for ¼ to two hours preferably about ½ hour, cooled and poured into water. The resulting precipitate is collected on a filter and washed with water. The crude product may be recrystallized, for instance from ethanol, to afford a pure product (5-cyano-4-pyrimidinylamino)acetic acid, ester (VI).

In the fourth step, the intermediate product (5-cyano-4-pyrimidinylamino)acetic acid, ester (VI) is added to an alkali metal ethoxide solution, preferably freshly prepared sodium in ethanol. The mixture is refluxed for about one to five hours, preferably about two to three hours, concentrated under reduced pressure and chilled in ice. The product solid is collected on a filter, triturated with dilute sodium hydroxide and filtered. The filter cake is recrystallized, for instance from ethanol, and then triturated, for instance with ether, to produce the product 5-amino-2,6-substituted - 7H - pyrrolo[2,3-d]pyrimidine (VII).

When the reaction is complete the intermediate product is separated by standard recovery methods. For instance, the inorganic salt may be removed by filtration and the filtrate concentrated under reduced pressure. Chilling of the concentrated solution causes separation of crystals which may be collected by filtration and washed with water.

The 5-amino-2,6 - substituted-7H-pyrrolo[2,3-d]pyrimidine (VII) of this invention may be further processed to prepare other useful compounds. For instance, where an amino group is present in the 5-position new and useful derivatives may be prepared according to the following scheme:

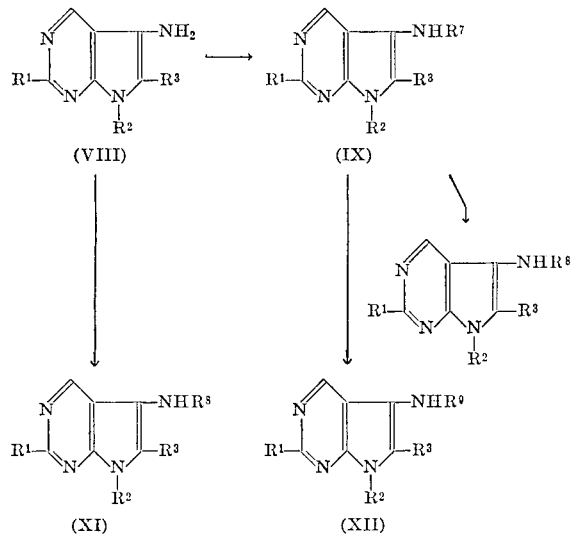

where:
$R^1$–$R^3$ are as defined above;
$R^7$ is halo(lower)alkylcarbonyl;
$R^8$ is lower alkoxyethylamino(lower)alkylcarbonyl, lower alkoxypropylamino(lower)alkylcarbonyl or lower alkoxybutylamino(lower)alkylcarbonyl; and
$R^9$ is morpholino(lower)alkylcarbonyl, lower alkyl, or lower alkylamino.

In accordance with the foregoing reaction scheme, the following derivatives may be prepared: A solution containing 4[(cyanomethyl)methylamino]-2-phenyl-5-pyrimidinecarbonitrile and alkali metal alkoxide preferably freshly prepared sodium ethoxide is refluxed for ½ to 4 hours, preferably 1 to 2 hours, and allow them to stand for 4 to 16 hours, preferably overnight. A precipitate forms and is collected on a filter, washed with an alkanol, preferably ethanol, several times to produce a crude product which may be recrystallized from an aprotic solvent, such as N,N-dimethylformamide, dimethylsulfoxide and sulfolane, and water to produce a purified product 5 - amino - 7H - pyrrolo[2,3-d]pyrimidine-6-carbonitrile (VIII). The latter product may be added in small portions to a halo lower alkyl acid chloride, such as chloroacetylchloride and stirred at room temperature for about 1 to 5 hours, preferably about 2 to 3 hours, and then warmed gently on a steam bath for about 5 to 60 minutes, preferably about 15 minutes. The reaction mixture is chilled, and the precipitate which forms is collected on a filter as 5 - haloalkylamido-7H-pyrrolo[2,3-d]pyrimidine-6-carbonitrile (IX).

The product 5 - haloalkylamido - 7H - pyrrolo[2-3-d]-pyrimidine-6-carbonitrile (IX) may be further reacted as shown in the reaction scheme by adding small portions to an alkoxy lower alkylamine, and the resulting mixture stirred at a room temperature for about 5 to 60 minutes, preferably 20 minutes, then heated on a steambath for 2 to 30 minutes, preferably 5 minutes. A small amount of water is added to the mixture which is then chilled in ice. The resulting precipitate is collected on a filter and recrystallized from an alkanol, such as ethanol, to produce the product 5-(lower alkoxyalkylamino) lower alkylamido - 7H-pyrrolo[2,3-d]pyrimidine-6-carbonitrile (X).

As an alternative, the compound 5-amino-7H-pyrrolo[2,3-d]pyrimidine-6-carbonitrile (VIII) may be added in small portions to a β-halo lower alkanoyl halide with stirring. The stirring is continued for about 10 to 90 minutes, preferably about 30 minutes and the excess acid chloride is removed under reduced pressure. The remaining solid product is added in small portions to alkoxy lower alkyl with stirring, and the stirring is continued for about ¼ to 3 hours, preferably about 1 hour. Removal of the excess amine under reduced pressure affords a solid residue which may be triturated with water, and then crystallized from absolute alkanol, such as ethanol, then from an aprotic solvent, such as dimethylformamide, to produce the pure product N-(6-cyano-7H-pyrrolo[2,3-d]-pyrimidin-5-yl) - 3 - (lower alkoxy(lower)alkylamino) (lower)alkylamide (XI).

The product 5 - haloalkylamido - 7H-pyrrolo[2,3-d]-pyrimidine-6-carbonitrile (IX) may, if desired, be added to a large excess of morpholine in small portions with stirring. Stirring is continued for about 5 to 90 minutes, preferably about 20 minutes at room temperature and then heated on a steam bath for about 1 to 30 minutes, preferably about 5 minutes. The addition of a large excess of cold water to the reaction mixture causes separation of the precipitate which may be collected on a filter and washed with water several times. Recrystallization of the crude product from an aprotic solvent, such as dimethylformamide affords the product N-(6-cyano-7H-pyrrolo[2,3-d]pyrimidin - 5 - yl) - 4 - cyclo(lower)alkyl (lower)alkylamide (XII).

If desired, derivatives can be prepared by the following reaction scheme where the starting materials have an amino group at the 5-position and a carboxamide group at the 6-position, and where $R^1$, $R^2$ and $R^9$ are as defined above.

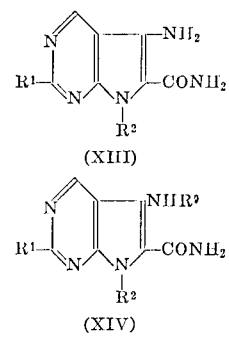

In accordance with the foregoing reaction scheme 5-amino - 7H - pyrrolo[2,3-d]pyrimidine - 6 - carboxamide (XIII) is added in small portions to an acid chloride, such as chloroacetyl chloride, at room temperature with vigorous stirring. Stirring is continued for about 5 to 60 minutes, preferably about 15 minutes then the excess acetyl chloride is removed by filtration. The 5-haloacetamido - 7H - pyrrolo[2,3-d]pyrimidine - 6 - carboxamide is collected on a filter, then added to a large excess of morpholine in small portions with stirring. Stirring is continued for about 5 to 60 minutes, preferably about 20 minutes at about 15 to 25° C., preferably room temperature, and then heated on a steam bath for about 1 to 30 minutes, preferably about 5 minutes. The addition of a large excess of cold water to the reaction mixture causes separation of a precipitate which is collected on a filter and washed with water several times. Recrystallization of the precipitate from an aprotic solvent, such as dimethylformamide, affords a purified product 5-(cyclo(lower)alkyamido - 7H - pyrrolo[2,3 - d]pyrimidine-6-carboxamide (XIV).

Further derivatives may be prepared in accordance with the following reaction scheme where the 5-position is substituted with an amine and the 6-position is substituted with a carboxylic acid ester where $R^1$, $R^3$ and $R^2$ are as defined above and $R^{10}$ is cycloalkylcarbamoyl(lower)alkyl.

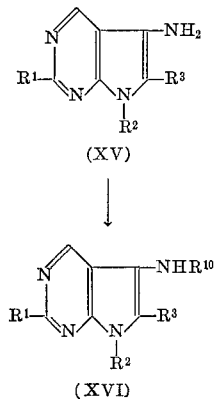

In accordance with the reaction scheme, a mixture of 5-amino-7H-pyrrolo[2,3 - d]pyrimidine-6-carboxylic acid, ester, sodium bicarbonate and an aprotic solvent, such as dimethylformamide, are mixed together and to the mixture is added N-cyclo(lower)alkylhalo(lower)alkanoyl amide in small portions. The resulting mixture is stirred at room temperature for about ½ to 4 hours, preferably about 1½ hours, then refluxed for about ¼ to 2 hours, preferably about ½ hour. After being cooled to room temperature, the reaction mixture is poured into a large excess of cold water. The precipitate thus separated is collected on a filter and washed with water to give the crude product which may be recrystallized from an alkanol, such as absolute ethanol, to form the purified product 5 - [cyclo(lower)alkylcarbamoyl(lower)alkylamino]-7H-pyrrolo[2,3-d]pyrimidine carboxylic acid, ester (XVI).

All of the 2,4,5-trisubstituted pyrimidines (II) may be used as intermediates in the preparation of 2,5,6-trisubstituted-7H-pyrrolo[2,3-d]pyrimidines (I) as described above. Some of the 2,4,5-trisubstituted pyrimidines (II) have been found to have central nervous system activity as depressants. That is, they produce a calming effect in the host at a parenteral dose of 12.7 milligrams per kilogram of host body weight (MPK) as is further described below.

The end products 5 - [cyclo(lower)alkylcarbamoyl(lower)alkyl]amino - 7H - pyrrolo[2,3-d]pyrimidine carboxylic acid, esters (XVI) are useful as stimulants at orally administered doses of 40 MPK as further described below. All of the other compounds of the invention are either active as depressants at a dose of 12.7 to 400 MPK or are intermediates in the preparation of the compounds which are active as depressants of the central nervous system. That is, they produce a calming effect in the host.

In the pharmacological evaluation of the biological activity of the compounds of this invention, the in vivo effects are tested as follows. The compound is administered intraperitoneally to three mice (14 to 24 grams) at each of the following doses: 400, 127, 40 and 12.7 mg./kg. The animals are watched for a minimum of two hours during which time signs of general stimulation (i.e. increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredients is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenternally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. Examples 1–5 illustrate the preparation from known starting materials of 2,4-disubstituted-5-pyrimidinecarbonitriles which are the starting materials for the preparation of 2,5,6-trisubstituted-7H-pyrrolo[2,3-d]pyrimidines having structural Formula I. Examples 6, 7 and 8 illustrate the preparation of the principal compounds of the present invention 5-amino-2,6-disubstituted - 7H - pyrrolo[2,3 - d]pyrimidines having the structure of Formula VII. Examples 9–14 illustrate the preparation of derivatives of 5-amino-2,6-disubstituted-7H-pyrrolo[2,3-d]pyrimidines.

The terms "g.," "ml.," "hr." and "min." are used for "grams," "milliliters," "hours," and "minutes" respectively. The symbol "φ" represents the phenyl group $C_6H_5$. All temperatures are given in degrees centigrade.

EXAMPLE 1

The following example illustrates the preparation of 4-hydroxy-2-phenyl-5-phenyl-5-pyrimidinecarboxamide, a compound of Formula IV from known starting materials.

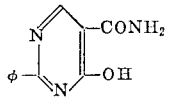

A mixture of 4-hydroxy-2-phenyl-5-pyrimidinecarboxylic acid, ethyl ester (5.8 g.) and 90 ml. of concentrated ammonium hydroxide was charged in a steel bomb and heated in a steam bath for 4.5 hr. The bomb was opened after being chilled, and the excess ammonia was evaporated in the open air on a steam bath to about 60 ml. Acidification of the concentrated solution with dilute hydrochloric acid caused separation of a precipitate which was collected on a filter and washed with water several times to give 4.4 g. of product which decomposed at 286°. Recrystallization from N,N-dimethylformamide increased the decomposition point to 292–295°.

Based on the formula $C_{11}H_9N_3O_2$, it was calculated that the elemental analysis by weight would be 61.39 percent carbon, 4.22 percent hydrogen and 19.53 percent nitrogen. The product was analyzed and the content was found to be 61.10 percent carbon, 4.26 percent hydrogen and 19.21 percent nitrogen, thus confirming the assumed formula. The foregoing may be expressed:

*Analysis.*—Calcd. for $C_{11}H_9N_3O_2$ (percent): C, 61.39; H, 4.22; N, 19.53. Found (percent): C, 61.10; H, 4.26; N, 19.21.

Following the procedure of Example 1 but substituting appropriate starting materials, products having the following substituents may be prepared:

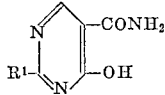

| Example: | $R^1$ |
|---|---|
| 1 | $C_6H_5$— |
| 1–1 | $m$-$ClC_6H_4$— |
| 1–2 | $o$-$FC_6H_4$— |
| 1–3 | $p$-$BrC_6H_4$— |
| 1–4 | $p$-$IC_6H_4$— |
| 1–5 | $p$-$CH_3C_6H_4$— |
| 1–6 | $m$-$C_2H_5C_6H_4$— |
| 1–7 | $p$-$C_3H_7C_6H_4$— |
| 1–8 | $p$-$C_4H_9C_6H_4$— |
| 1–9 | $p$-$CH_3OC_6H_4$— |
| 1–10 | $o$-$C_2H_5OC_6H_4$— |
| 1–11 | $p$-$C_3H_7OC_6H_4$— |
| 1–12 | $p$-$C_4H_9OC_6H_4$— |
| 1–13 | $CH_3$ |
| 1–14 | $C_2H_5$ |
| 1–15 | $C_3H_7$ |
| 1–16 | $C_4H_9$ |
| 1–17 | —$SCH_3$ |
| 1–18 | —$SC_2H_5$ |
| 1–19 | —$SC_3H_7$ |
| 1–20 | —$SC_4H_9$ |

EXAMPLE 2

The following illustrates the preparation of 4-chloro-2-phenyl-5-pyrimidinecarbonitrile, a compound of Example V.

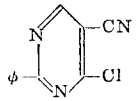

A mixture of 4-hydroxy-2-phenyl-5-pyrimidinecarboxamide (1.1 g.) and phosphorus oxychloride (30 ml.) was refluxed for 3.5 hrs., then the excess phosphorus oxychloride was removed under reduced pressure. The remaining traces of phosphorus oxychloride were destroyed by adding crushed ice, and product was collected on a filter, and washed with water several times. The product weighed 1.0 g., and had a melting point of 190°. Recrystallization from absolution ethanol increased the melting point to 193–194°.

*Analysis.*—Calcd. for $C_{11}H_6ClN_3$ (percent): C, 61.27; H, 2.80; N, 19.49; Cl, 16.44. Found (percent): C, 61.56; H, 2.80; N, 19.70; Cl, 16.36.

The product was evaluated in the above described pharmacological procedure and found to decrease motor activity at a dose of 400 milligrams per kilogram of host body weight administered parenterally.

Following the procedure of Example 2 but substituting appropriate starting materials, products having the following substituents may be prepared:

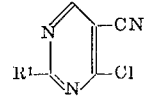

| Example: | $R^1$ |
|---|---|
| 2 | $C_6H_5$— |
| 2–1 | $m$-$ClC_6H_4$— |
| 2–2 | $o$-$FC_6H_4$— |
| 2–3 | $p$-$BrC_6H_4$— |
| 2–4 | $p$-$IC_6H_4$— |
| 2–5 | $p$-$CH_3C_6H_4$— |
| 2–6 | $m$-$C_2H_5C_6H_4$— |
| 2–7 | $p$-$C_3H_7C_6H_4$— |
| 2–8 | $p$-$C_4H_9C_6H_4$— |
| 2–9 | $p$-$CH_3OC_6H_4$— |
| 2–10 | $o$-$C_2H_5OC_6H_4$— |
| 2–11 | $p$-$C_3H_7OC_6H_4$— |
| 2–12 | $p$-$C_4H_9OC_6H_4$— |
| 2–13 | $CH_3$ |
| 2–14 | $C_2H_5$ |
| 2–15 | $C_3H_7$ |
| 2–16 | $C_4H_9$ |
| 2–17 | —$SCH_3$ |
| 2–18 | —$SC_2H_5$ |
| 2–19 | —$SC_3H_7$ |
| 2–20 | —$SC_4H_9$ |

EXAMPLE 3

The following illustrates the preparation of (5-cyano-2-phenyl-4-pyrimidinylamino)acetic acid, ethyl ester, a compound of Formula VI.

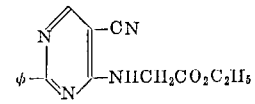

A mixture of 16.8 g. of glycine ethyl ester hydrochloride, 12.7 g. of sodium carbonate and 110 ml. of 95% ethanol was heated under reflux for ¾ hr. To this mixture was added 8.6 g. of 4-chloro-2-phenyl-5-pyrimidinecarbonitrile, and the resulting mixture was refluxed for ½ hr. After being cooled, the mixture was poured into water. The resulting precipitate was collected on a filter and washed with water giving 7.3 g. Two crystallizations from ethanol afforded an analytical sample having a melting point of 154–157° C.

*Analysis.*—Calcd. for $C_{15}H_{14}N_4O_2$ (percent): C, 63.82; H, 5.00; N, 19.85. Found (percent): C, 63.62; H, 5.18; N, 19.80.

The product was evaluated according to the above described pharmacological procedure and found to decrease motor activity at a dose of 12.7 milligrams per kilogram administered parenterally and at a dose of 127 milligrams per kilogram administered orally.

Following the procedure of Example 3 but substituting appropriate starting materials, products having the following substituents may be prepared:

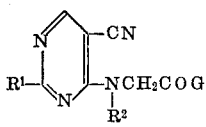

| | R¹ | G | R² |
|---|---|---|---|
| Example: | | | |
| 3 | C₆H₅— | C₂H₅O | H |
| 3-1 | m-ClC₆H₄— | CH₃O | H |
| 3-2 | o-FC₆H₄— | C₃H₇O | C₂H₅ |
| 3-3 | p-BrC₆H₄— | C₄H₉O | C₃H₇ |
| 3-4 | p-IC₆H₄— | CH₃O | C₄H₉ |
| 3-5 | p-CH₃C₆H₄ | C₂H₅O | H |
| 3-6 | m-C₂H₅C₆H₄— | C₃H₇O | CH₃ |
| 3-7 | p-C₃H₇C₆H₄— | C₄H₉O | C₂H₅ |
| 3-8 | p-C₄H₉C₆H₄— | CH₃O | C₃H₇ |
| 3-9 | p-CH₃OC₆H₄— | C₂H₅O | C₄H₉ |
| 3-10 | o-C₂H₅OC₆H₄— | C₃H₇O | H |
| 3-11 | p-C₃H₇OC₆H₄ | C₄H₉O | CH₃ |
| 3-12 | p-C₄H₉OC₆H₄ | CH₃O | C₂H₅ |
| 3-13 | CH₃ | C₂H₅O | C₃H₇ |
| 3-14 | C₂H₅ | C₃H₇O | C₄H₉ |
| 3-15 | C₃H₇ | C₄H₉O | H |
| 3-16 | C₄H₉ | CH₃O | CH₃ |
| 3-17 | —SCH₃ | C₂H₅O | C₂H₅ |
| 3-18 | —SC₂H₅ | C₃H₇O | C₃H₇ |
| 3-19 | —SC₃H₇ | C₄H₉O | C₄H₉ |
| 3-20 | —SC₄H₉ | CH₃O | H |

EXAMPLE 4

The following illustrates the preparation of 4[(carbamoylmethyl)amino] - 2 - phenyl - 5 - pyrimidinecarbonitrile, a compound having structural Formula VI.

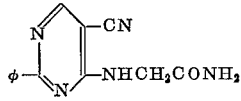

To a mixture of glycinamide hydrochloride (22 g.), sodium bicarbonate (16 g.) and 95% ethanol (100 ml.) kept under reflux for 45 minutes was added 10 g. 4-chloro-2-phenyl-5-pyrimidinecarbonitrile. Refluxing was continued for a total of 2.5 hrs. After the reaction mixture was cooled to room temperature, about 100 ml. of ice water was added whereby precipitation of a solid material occurred. The precipitate was collected on a filter and washed with water several times. Recrystallization from N,N-dimethylformamide afforded 10 g. of product having a melting point of 275–277° C.

*Analysis.*—Calcd. for $C_{13}H_{11}N_5O$ (percent): C, 61.65; H, 4.38; N, 27.66. Found (percent): C, 61.44; H, 4.35; N, 27.52.

Following the procedure of Example 4 but substituting appropriate starting materials, products having the following substituents may be prepared:

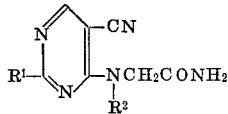

| | R¹ | R² |
|---|---|---|
| Example: | | |
| 4 | C₆H₅— | H |
| 4-1 | m-ClC₆H₄— | H |
| 4-2 | o-FC₆H₄— | C₂H₅ |
| 4-3 | p-BrC₆H₄— | C₃H₇ |
| 4-4 | p-IC₆H₄— | C₄H₉ |
| 4-5 | p-CH₃C₆H₄— | H |
| 4-6 | m-C₂H₅C₆H₄— | CH₃ |
| 4-7 | p-C₃H₇C₆H₄— | C₂H₅ |
| 4-8 | p-C₄H₉C₆H₄— | C₃H₇ |
| 4-9 | p-CH₃OC₆H₄— | C₄H₉ |
| 4-10 | o-C₂H₅OC₆H₄— | H |
| 4-11 | p-C₃H₇OC₆H₄— | CH₃ |
| 4-12 | p-C₄H₉OC₆H₄— | C₂H₅ |
| 4-13 | CH₃ | C₃H₇ |
| 4-14 | C₂H₅ | C₄H₉ |
| 4-15 | C₃H₇ | H |
| 4-16 | C₄H₉ | CH₃ |
| 4-17 | —SCH₃ | C₂H₅ |
| 4-18 | —SC₂H₅ | C₃H₇ |
| 4-19 | —SC₃H₇ | C₄H₉ |
| 4-20 | —SC₄H₉ | H |

EXAMPLE 5

The following illustrates the preparation of 4[(cyanomethyl)methylamino] 2 - phenyl - 5 - pyrimidinecarbonitrile, a compound of Formula VI.

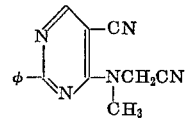

A mixture of 4-chloro-2-phenyl-5-pyrimidinecarbonitrile (2.5 g.), N-methylglycinonitrile hydrochloride (5.3 g.) and sodium bicarbonate (5 g.) in 45 ml. of ethanol was refluxed with vigorous stirring for 3 hr. The inorganic salt was removed by filtration after the reaction mixture was cooled to room temperature. Concentration of the filtrate under reduced pressure, and subsequent chilling caused separation of a precipitate which has collected on a filter to give 0.7 g. of product having a melting point of 179–182°. Recrystallization from absolute ethanol increased the melting point to 182–184°.

*Analysis.*—Calcd. for $C_{14}H_{11}N_5$ (percent): C, 67.45; H, 4.45; N, 28.10. Found (percent): C, 67.40; H, 4.40; N, 28.80.

The product was evaluated in the above-described pharmacological procedure and was found to reduce motor activity at a dose of 12.7 milligrams per kilogram administered parenterally.

Following the procedure of Example 5 but substituting appropriate starting materials, products having the following substituents may be prepared:

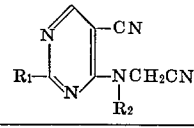

| | R¹ | R² |
|---|---|---|
| Example: | | |
| 5 | C₆H₅— | CH₃ |
| 5-1 | m-ClC₆H₄— | H |
| 5-2 | o-FC₆H₄— | C₂H₅ |
| 5-3 | p-BrC₆H₄— | C₃H₇ |
| 5-4 | p-IC₆H₄— | C₄H₉ |
| 5-5 | p-CH₃C₆H₄— | H |
| 5-6 | m-C₂H₅C₆H₄— | CH₃ |
| 5-7 | p-C₃H₇C₆H₄— | C₂H₅ |
| 5-8 | p-C₄H₉C₆H₄— | C₃H₇ |
| 5-9 | p-CH₃OC₆H₄— | C₄H₉ |
| 5-10 | o-C₂H₅OC₆H₄— | H |
| 5-11 | p-C₃H₇OC₆H₄— | CH₃ |
| 5-12 | p-C₄H₉OC₆H₄ | C₂H₅ |
| 5-13 | CH₃ | C₃H₇ |
| 5-14 | C₂H₅ | C₄H₉ |
| 5-15 | C₃H₇ | H |
| 5-16 | C₄H₉ | CH₃ |
| 5-17 | —SCH₃ | C₂H₅ |
| 5-18 | —SC₂H₅ | C₃H₇ |
| 5-19 | —SC₃H₇ | C₄H₉ |
| 5-20 | —SC₄H₉ | H |

EXAMPLE 6

The following illustrates the preparation of 5-amino-2-phenyl-7H-pyrrolo[2,3-d]pyrimidine - 6 - carboxylic acid, ethyl ester, a compound of Formula VII.

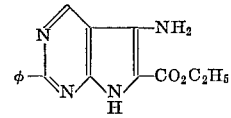

To a sodium ethoxide solution (1.44 g. sodium in 450 ml. ethanol) was added 17.5 g. of (5-cyano-2-phenyl-4-pyrimidinylamino)acetic acid, ethyl ester. This mixture was refluxed for 2¼ hrs., concentrated under reduced pressure, and chilled in ice giving 13.2 g. of solid which was collected on a filter and decomposed at 340–360°. This solid was triturated with dilute sodium hydroxide and filtered. The filter cake was recrystallized from ethanol then triturated with ether to give 6.0 g. of product having a melting point of 202–204.5°.

*Analysis.*—Calcd. for $C_{15}H_{14}N_4O_2$ (percent): C, 63.82; H, 5.00; N, 19.85. Found (percent): C, 63.62; H, 5.18; N, 19.80.

The product was evaluated in the above-described pharmacological procedure and found to reduce motor activity at a dose of 127 milligrams per kilogram administered parenterally.

Following the procedure of Example 6 but substituting appropriate starting materials, products having the following substituents may be prepared:

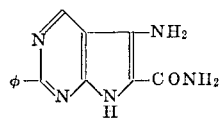

| Example | $R^1$ | $R^2$ | G |
|---|---|---|---|
| 6 | $C_6H_5$ | H | $C_2H_5O$ |
| 6-1 | m-$ClC_6H_4$— | H | $CH_3O$ |
| 6-2 | o-$FC_6H_4$— | $C_2H_5$ | $C_3H_7O$ |
| 6-3 | p-$BrC_6H_4$— | $C_3H_7$ | $C_4H_9O$ |
| 6-4 | p-$IC_6H_4$— | $C_4H_9$— | $CH_3O$ |
| 6-5 | p-$CH_3C_6H_4$— | H | $C_2H_5O$ |
| 6-6 | m-$C_2H_5C_6H_4$— | $CH_3$ | $C_3H_7O$ |
| 6-7 | p-$C_3H_7C_6H_4$— | $C_2H_5$ | $C_4H_9O$ |
| 6-8 | p-$C_4H_9C_6H_4$— | $C_3H_7$ | $CH_3O$ |
| 6-9 | p-$CH_3OC_6H_4$— | $C_4H_9$— | $C_2H_5O$ |
| 6-10 | o-$C_2H_5OC_6H_4$— | H | $C_3H_7O$ |
| 6-11 | p-$C_3H_7OC_6H_4$— | $CH_3$ | $C_4H_9O$ |
| 6-12 | p-$C_4H_9OC_6H_4$— | $C_2H_5$ | $CH_3O$ |
| 6-13 | $CH_3$ | $C_3H_7$ | $C_2H_5O$ |
| 6-14 | $C_2H_5$ | $C_4H_9$ | $C_3H_7O$ |
| 6-15 | $C_3H_7$ | H | $C_4H_9O$ |
| 6-16 | $C_4H_9$ | $CH_3$ | $CH_3O$ |
| 6-17 | —$SCH_3$ | $C_2H_5$ | $C_2H_5O$ |
| 6-18 | —$SC_2H_5$ | $C_3H_7$ | $C_3H_7O$ |
| 6-19 | —$SC_3H_7$ | $C_4H_9$ | $C_4H_9O$ |
| 6-20 | —$SC_4H_9$ | $CH_3$ | $CH_3O$ |

EXAMPLE 7

The following illustrates the preparation of 5-amino-2-phenyl - 7$\underline{H}$ - pyrrolo[2,3 - $d$]pyrimidine - 6 - carboxamide, a compound of Formula VII.

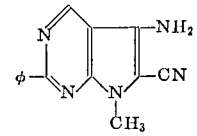

To a solution containing 0.46 g. of sodium as a sodium methoxide in 50 ml. of absolute methanol was added 5.3 g. of 4[(carbamoylmethyl)amino]-2-phenyl-5-pyrimidinecarbonitrile, and the resulting mixture was refluxed for 2 hrs. Separation of a yellow precipitate started to occur in 1¼ hrs. The precipitate was collected on a filter after the reaction mixture had been chilled in ice. Recrystallization from N,N-dimethylformamide and water gave 1.7 g. of product, having a melting point higher than 360°.

*Analysis.*—Calcd. for $C_{13}H_{11}N_5O$ (percent): C, 61.65; H, 4.38; N, 27.66. Found (percent): C, 61.79; H, 4.31; N, 27.32.

The product was evaluated in the above-described pharmacological procedure and found to reduce motor activity at a dose of 127 milligrams per kilogram administered parenterally.

Following the procedure of Example 7 but substituting appropriate starting materials, products having the following substituents may be prepared:

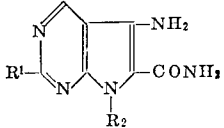

| Example | $R^1$ | $R^2$ |
|---|---|---|
| 7 | $C_6H_5$— | H |
| 7-1 | m-$ClC_6H_4$— | H |
| 7-2 | o-$FC_6H_4$— | $C_2H_5$ |
| 7-3 | p-$BrC_6H_4$— | $C_3H_7$ |
| 7-4 | p-$IC_6H_4$— | $C_4H_9$ |
| 7-5 | p-$CH_3C_6H_4$— | H |
| 7-6 | m-$C_2H_5C_6H_4$— | $CH_3$ |
| 7-7 | p-$C_3H_7C_6H_4$— | $C_2H_5$ |
| 7-8 | p-$C_4H_9C_6H_4$— | $C_3H_7$ |
| 7-9 | p-$CH_3OC_6H_4$— | $C_4H_9$ |
| 7-10 | o-$C_2H_5OC_6H_4$ | H |
| 7-11 | p-$C_3H_7OC_6H_4$— | $CH_3$ |
| 7-12 | p-$C_4H_9OC_6H_4$— | $C_2H_5$ |
| 7-13 | $CH_3$ | $C_3H_7$ |
| 7-14 | $C_2H_5$ | $C_4H_9$ |
| 7-15 | $C_3H_7$ | H |
| 7-16 | $C_4H_9$ | $CH_3$ |
| 7-17 | —$SCH_3$ | $C_2H_5$ |
| 7-18 | —$SC_2H_5$ | $C_3H_7$ |
| 7-19 | —$SC_3H_7$ | $C_4H_9$ |
| 7-20 | —$SC_4H_9$ | H |

EXAMPLE 8

The following illustrates the preparation of 5-amino-7-methyl - 2 - phenyl - 7$\underline{H}$ - pyrrolo[2,3-$d$]pyrimidine-6-carbonitrile, a compound of general Formula VII and of the particular Formula VIII.

A solution containing 7.5 g. of 4-[(cyanomethyl)methylamino]-2-phenyl-5-pyrimidine carbonitrile, and 0.69 g. of sodium in 100 ml. of ethanol was refluxed for 1.5 hr. and allowed to set overnight. The yellow precipitate which was deposited was collected on a filter, and washed with ethanol several times to give 7.3 g. of product which decomposed at 287–289°. Recrystallization from N,N-dimethylformamide and water afforded an analytical sample which decomposed at 288–291°.

*Analysis.*—Calcd. for $C_{14}H_{11}N_5$ (percent): C, 67.45; H, 4.40; N, 28.10. Found (percent): C, 67.11; H, 4.47; N, 28.19.

The product was evaluated in the above-described pharmacological procedure and found to induce touch hyperactivity at 40 milligrams per kilogram of host body weight administered orally and exophthalmos at a dose of 127 milligrams per kilogram administered orally.

Following the procedure of Example 8 but substituting appropriate starting materials, products having the following substituents may be prepared:

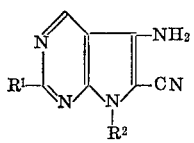

| | $R^1$ | $R^2$ |
|---|---|---|
| Example: | | |
| 8 | $C_6H_5-$ | $CH_3$ |
| 8-1 | $m\text{-}ClC_6H_4-$ | H |
| 8-2 | $o\text{-}FC_6H_4-$ | $C_2H_5$ |
| 8-3 | $p\text{-}BrC_6H_4-$ | $C_3H_7$ |
| 8-4 | $p\text{-}IC_6H_4-$ | $C_4H_9$ |
| 8-5 | $p\text{-}CH_3C_6H_4-$ | H |
| 8-6 | $m\text{-}C_2H_5C_6H_4-$ | $CH_3$ |
| 8-7 | $p\text{-}C_3H_7C_6H_4-$ | $C_2H_5$ |
| 8-8 | $p\text{-}C_4H_9C_6H_4-$ | $C_3H_7$ |
| 8-9 | $p\text{-}CH_3OC_6H_4-$ | $C_4H_9$ |
| 8-10 | $o\text{-}C_2H_5OC_6H_4-$ | H |
| 8-11 | $p\text{-}C_3H_7OC_6H_4$ | $CH_3$ |
| 8-12 | $p\text{-}C_4H_9OC_6H_4$ | $C_2H_5$ |
| 8-13 | $CH_3$ | $C_3H_7$ |
| 8-14 | $C_2H_5$ | $C_4H_9$ |
| 8-15 | $C_3H_7$ | H |
| 8-16 | $C_4H_9$ | $CH_3$ |
| 8-17 | $-SCH_3$ | $C_2H_5$ |
| 8-18 | $-SC_2H_5$ | $C_3H_7$ |
| 8-19 | $-SC_3H_7$ | $C_4H_9$ |
| 8-20 | $-SC_4H_9$ | H |

EXAMPLE 9

The following illustrates the preparation of 5-chloroacetamido - 7 - methyl - 2 - phenyl-7H-pyrrolo[2,3-d]pyrimidine-6-carbonitrile, a compound of Formula IX.

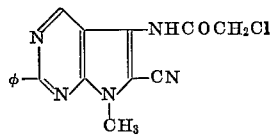

5 - amino - 7 - methyl - 2 - phenyl-7H-pyrrolo[2,3-d] pyrimidine-6-carbonitrile (2.0 g.) prepared as described in Example 8 was added in small portions to 10 ml. of chloroacetyl chloride, and stirred at room temperature for 2.5 hrs., then warmed gently on a steam bath for 15 min. After the reaction mixture was being chilled, a precipitate was formed. This material was collected on a filter, and used directly in the reaction of Example 10.

Following the procedure of Example 9 but using a nitrile, amide or ester and reacting it with a proper acid chloride, products having the following substituents may be prepared:

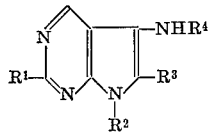

| | $R^1$ | $R^2$ | $R^3$ | $R^4$ |
|---|---|---|---|---|
| Example: | | | | |
| 9 | $C_6H_5-$ | $CH_3$ | CN | $COCH_2Cl$ |
| 9-1 | $m\text{-}ClC_6H_4-$ | H | $CONH_2$ | $CO(CH_2)_2Cl$ |
| 9-2 | $o\text{-}FC_6H_4$ | $C_2H_5$ | $COOCH_3$ | $CO(CH_2)_3Cl$ |
| 9-3 | $p\text{-}BrC_6H_4-$ | $C_3H_7$ | $COOC_2H_5$ | $CO(CH_2)_4Cl$ |
| 9-4 | $p\text{-}IC_6H_4-$ | $C_4H_9$ | $COOC_3H_7$ | $COCH_2Br$ |
| 9-5 | $p\text{-}CH_3C_6H_4-$ | H | $COOC_4H_9$ | $CO(CH_2)_4Br$ |
| 9-6 | $m\text{-}C_2H_5C_6H_4-$ | $CH_3$ | CN | $CO(CH_2)_2Cl$ |
| 9-7 | $p\text{-}C_3H_7C_6H_4-$ | $C_2H_5$ | $CONH_2$ | $CO(CH_2)_2Cl$ |
| 9-8 | $p\text{-}C_4H_9C_6H_4-$ | $C_3H_7$ | $COOCH_3$ | $CO(CH_2)_3Cl$ |
| 9-9 | $p\text{-}CH_3OC_6H_4-$ | $C_4H_9$ | $COOC_2H_5$ | $COCH_2Br$ |
| 9-10 | $o\text{-}C_2H_5OC_6H_4-$ | H | $COOC_3H_7$ | $CO(CH_2)_2Cl$ |
| 9-11 | $p\text{-}C_3H_7OC_6H_4-$ | $CH_3$ | $COOC_4H_9$ | $CO(CH_2)_3Cl$ |
| 9-12 | $p\text{-}C_4H_9OC_6H_4-$ | $C_2H_5$ | CN | $CO(CH_2)_2Br$ |
| 9-13 | $CH_3$ | $C_3H_7$ | $CONH_2$ | $COCH_2Cl$ |
| 9-14 | $C_2H_5$ | $C_4H_9$ | $COOCH_3$ | $COCH_2Br$ |
| 9-15 | $C_3H_7$ | H | $COOC_2H_5$ | $CO(CH_2)_3Cl$ |
| 9-16 | $C_4H_9$ | $CH_3$ | $COOC_3H_7$ | $CO(CH_2)_4Cl$ |
| 9-17 | $-SCH_3$ | $C_2H_5$ | $COOC_4H_9$ | $COCH_2Cl$ |
| 9-18 | $-SC_2H_5$ | $C_3H_7$ | CN | $CO(CH_2)_2Cl$ |
| 9-19 | $-SC_3H_7$ | $C_4H_9$ | $CONH_2$ | $CO(CH_2)_2Br$ |
| 9-20 | $-SC_4H_9$ | H | $COOCH_3$ | $COCH_2Cl$ |

EXAMPLE 10

The following illustrates the preparation of 5-[2-(2-methoxyethylamino)acetamido] - 7 - methyl - 2 - phenyl-7H-pyrrolo[2,3-d]pyrimidine-6-carbonitrile, a compound of Formula X.

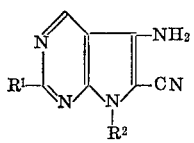

5 - chloroacetamido - 7 - methyl - 2 - phenyl - 7H-pyrrolo[2,3-d]pyrimidine-6-carbonitrile (2.0 g.) prepared as described in Example 9 was added in small portions to 15 ml. of 2-methoxyethylamine, and the resulting mixture was stirred at room temperature for 20 min., then heated on a steam bath for 5 min. A small amount of water was added to the mixture which was then chilled in ice. The precipitate which resulted was collected on a filter, and recrystallized from ethanol to give 1.2 g. of product having a melting point of 158–160°.

Analysis.—Calcd. for $C_{19}H_{20}N_6O_2$ (percent): C, 62.62; H, 5.53; N, 23.06. Found (percent): C, 63.32; H, 5.19; N, 22.77.

The product was evaluated in the above-described pharmacological procedure and found to depress motor activity at a dose of 400 milligrams per kilogram administered parenterally.

EXAMPLE 11

The following illustrates the preparation of N-(6-cyano-7-methyl-2-phenyl - 7H - pyrrolo[2,3-d]pyrimidine-5-yl)-3-(2-methoxyethylamino)propionamide, hydrochloride, a compound of Formula XI.

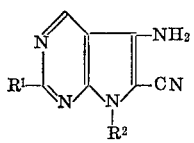

Two grams of 5-amino-7-methyl-2-phenyl-7H-pyrrolo [2,3-d]pyrimidinecarbonitrile was added in small portions to β-chloropropionyl chloride with stirring. Stirring was continued for 0.5 hr., and the excess acid chloride was removed under reduced pressure. The remaining solid product was added in small portions to 15 ml. of 2-methoxyethylamine with stirring, and the stirring was continued for 1 hr. Removal of the excess amine under reduced pressure afforded a solid residue which was triturated with water, then recrystallized first from absolute ethanol, then from N,N-dimethylformamide and had a melting point of 245–248°.

Analysis.—Calcd. for $C_{20}H_{22}N_6O_2 \cdot$ HCl (percent): C, 57.90; H, 5.59; N, 20.26. Found (percent): C, 57.78; H, 5.58; N, 20.48.

The product was evaluated in the above-described pharmacological procedure and found to depress motor activity at a dose of 40 milligrams per kilogram administered parenterally. The highest non-lethal dose was 127 milligrams per kilogram.

Following the procedure of Example 11 but using a nitrile, amide or ester and reacting it with a suitable substituted chlorocarboxylic acid chloride, followed by reaction of the product with an appropriate amine, products having the following substituents may be prepared:

| | R¹ | R² | R³ | R⁴ |
|---|---|---|---|---|
| Example: | | | | |
| 11 | $C_6H_5$— | $CH_3$ | CN | $CO(CH_2)_2NH(CH_2)_2OCH_3$ |
| 11-1 | m-$ClC_6H_4$— | H | $CONH_2$ | $CO(CH_2)_3NH(CH_2)_2OC_2H_5$ |
| 11-2 | o-$FC_6H_4$— | $C_2H_5$ | $COOCH_3$ | $COCH_2NH(CH_2)_3OC_3H_7$ |
| 11-3 | p-$BrC_6H_4$— | $C_3H_7$ | $COOC_2H_5$ | $CO(CH_2)_4NH(CH_2)_2OC_4H_9$ |
| 11-4 | p-$IC_6H_4$— | $C_4H_9$ | $COOC_3H_7$ | $COCH_2NH(CH_2)_2OCH_3$ |
| 11-5 | p-$CH_3C_6H_4$— | H | $COOC_4H_9$ | $CO(CH_2)_2NH(CH_2)_3OC_2H_5$ |
| 11-6 | m-$C_2H_5C_6H_4$— | $CH_3$ | CN | $CO(CH_2)_3NH(CH_2)_2OC_3H_7$ |
| 11-7 | p-$C_3H_7C_6H_4$— | $C_2H_5$ | $CONH_2$ | $CO(CH_2)_2NH(CH_2)_2OC_2H_5$ |
| 11-8 | p-$C_4H_9C_6H_4$— | $C_3H_7$ | $COOCH_3$ | $CO(CH_2)_3NH(CH_2)_2OCH_3$ |
| 11-9 | p-$CH_3OC_6H_4$— | $C_4H_9$ | $COOC_2H_5$ | $CO(CH_2)_2NH(CH_2)_2OC_2H_5$ |
| 11-10 | o-$C_2H_5OC_6H_4$— | H | $COOC_3H_7$ | $CO(CH_2)_2NH(CH_2)_3OC_2H_5$ |
| 11-11 | p-$C_3H_7OC_6H_4$— | $CH_3$ | $COOC_4H_9$ | $COCH_2NH(CH_2)_2OCH_3$ |
| 11-12 | p-$C_4H_9OC_6H_4$— | $C_2H_5$ | CN | $CO(CH_2)_2NH(CH_2)_3OCH_3$ |
| 11-13 | $CH_3$ | $C_3H_7$ | $CONH_2$ | $COCH_2NH(CH_2)_3OC_4H_9$ |
| 11-14 | $C_2H_5$ | $C_4H_9$ | $COOCH_3$ | $CO(CH_2)_2NH(CH_2)_2OCH_3$ |
| 11-15 | $C_3H_7$ | H | $COOC_2H_5$ | $CO(CH_2)_3NH(CH_2)_2OC_2H_5$ |
| 11-16 | $C_4H_9$ | $CH_3$ | $COOC_3H_7$ | $CO(CH_2)_4NH(CH_2)_3OCH_3$ |
| 11-17 | —$SCH_3$ | $C_2H_5$ | $COOC_4H_9$ | $CO(CH_2)_2NH(CH_2)_2OCH_3$ |
| 11-18 | —$SC_2H_5$ | $C_3H_7$ | CN | $CO(CH_2)_3NH(CH_2)_3OC_2H$ |
| 11-19 | —$SC_3H_7$ | $C_4H_9$ | $CONH_2$ | $COCH_2NH(CH_2)_2OCH_3$ |
| 11-20 | —$SC_4H_9$ | H | $COOCH_3$ | $CO(CH_2)_4NH(CH_2)_4OC_4H_9$ |

EXAMPLE 12

The following illustrates the preparation of N-(6-cyano - 7 - methyl-2-phenyl-7H-pyrrolo[2,3-$d$]pyrimidin-5-yl)-4-morpholinoacetamide, a compound of Formula XII.

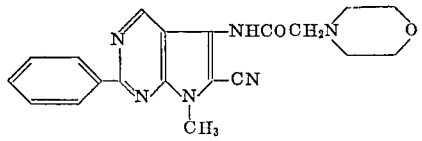

5-chloro-acetamido-7-methyl - 2 - phenyl-7$\underline{H}$-pyrrolo[2,3-$d$]pyrimidine-6-carbonitrile (2.5 g.) was added in small portions to 10 ml. of chloroacetyl chloride at room temperature with vigorous stirring. Stirring was continued for an additional 15 min., then the excess acetyl chloride was removed by filtration. The 5-chloro-acetamido-2-phenyl - 7$\underline{H}$ - pyrrolo[2,3-$d$]pyrimidine - 6 - carbonitrile which was collected on the filter was then added to 15 ml. of morpholine in small portions with stirring. Stirring was continued for 20 min. at room temperature, and heated on a steam bath for 5 min. The addition of a large excess of cold water to the reaction mixture caused separation of a precipitate which was collected on a filter and washed with water several times. Recrystallization of the 2.0 g. of product from N,N-dimethylformamide afforded an analytical sample which decomposed at a temperature of 275–277°.

*Analysis.*—Calcd. for $C_{20}H_{20}N_6O_2$ (percent): C, 63.82; H, 5.36; N, 22.33. Found (percent): C, 63.47; H, 5.39; N, 22.35.

The product was evaluated in the above-described pharmacological procedure and found to depress motor activity at a dose of 40 milligrams per kilogram administered parenterally.

EXAMPLE 13

The following illustrates the preparation of 5-(2-morpholinoacetamido)-2-phenyl - 7$\underline{H}$ - pyrrolo[2,3-$d$]pyrimidine-6-carboxamide, a compound of Formula XIV.

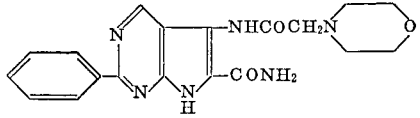

5-amino - 2 - phenyl-7$\underline{H}$-pyrrolo[2,3-$d$]pyrimidine-6-carboxamide (2.0 g.) prepared as described in Example 7 was added in small portions to 10 ml. of chloroacetylchloride at room temperature with vigorous stirring. Stirring was continued for an additional 15 min., then the excess acetyle chloride was removed by filtration. The 5-chloroacetamido - 2 - phenyl - 7H - pyrrolo[2,3-$d$]pyrimidine-6-carboxamide which was collected on the filter was then added to a large excess of morpholine in small portions with stirring. Stirring was continued for 20 min. at room temperature, then heated on a steam bath for 5 min. The addition of a large excess of cold water to the reaction mixture caused separation of a precipitate which was collected on a filter and washed with water several times. Recrystallization of the precipitate from N,N-dimethylformamide afforded an analytical sample which decomposed at 304–306°.

*Analysis.*—Calcd. for $C_{19}H_{20}N_6O_3$ (percent): C, 59.99; H, 5.30; N, 22.09. Found (percent): C, 60.07; H, 5.37; N, 21.87.

The product was evaluated in the above-described pharmacological procedure and found to depress motor activity at a dose of 400 milligrams per kilogram of host body weight administered parenterally.

Following the procedure of Examples 12 and 13 but using the corresponding ester and reacting it with a suitable substituted chlorocarboxylic acid chloride, followed by reaction of the product with a suitable substituted amine, products having the following substituents may be prepared:

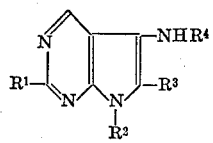

| | R¹ | R² | R³ | R⁴ |
|---|---|---|---|---|
| Example: | | | | |
| 12 | C₆H₅— | CH₃ | CN | COCH₂NCH₂CH₂OCH₂CH₂ |
| 13 | C₆H₅— | H | CONH₂ | COCH₂NCH₂CH₂OCH₂CH₂ |
| 13-1 | m-ClC₆H₄— | H | CONH₂ | CO(CH₂)₂NCH₂CH₂OCH₂CH₂ |
| 13-2 | o-FC₆H₄— | C₂H₅ | COOCH₃ | CO(CH₂)₃NCH₂CH₂OCH₂CH₂ |
| 13-3 | p-BrC₆H₄— | C₃H₇ | COOC₂H₅ | CH₃CO |
| 13-4 | p-IC₆H₄— | C₄H₉ | COOC₃H₇ | COCH₂NCH₂CH₂OCH₂CH₂ |
| 13-5 | p-CH₃C₆H₄— | H | COOC₄H₉ | CO(CH₂)₄NCH₂CH₂OCH₂CH₂ |
| 13-6 | m-C₂H₅C₆H₄— | CH₃ | CN | CO(CH₂)NCH₂CH₂OCH₂CH₂ |
| 13-7 | p-C₃H₇C₆H₄— | C₂H₅ | CONH₂ | C₂H₅CO |
| 13-8 | p-C₄H₉C₆H₄— | C₃H₇ | COOCH₃ | CH₃CO |
| 13-9 | p-CH₃OC₆H₄— | C₄H₉ | COOC₂H₅ | COCH₂NCH₂CH₂OCH₂CH₂ |
| 13-10 | o-C₂H₅OC₆H₄— | H | COOC₃H₇ | C₃H₇CO |
| 13-11 | p-C₃H₇OC₆H₄— | CH₃ | COOC₄H₉ | CO(CH₂)₃NCH₂CH₂OCH₂CH₂ |
| 13-12 | p-C₄H₉OC₆H₄— | C₂H₅ | CN | C₃H₇CO |
| 13-13 | CH₃ | C₃H₇ | CONH₂ | COCH₂NCH₂CH₂OCH₂CH₂ |
| 13-14 | C₂H₅ | C₄H₉ | COOCH₃ | CO(CH)₂NCH₂CH₂OCH₂CH₂ |
| 13-15 | C₃H₇ | H | COOC₂H₅ | C₂H₅CO |
| 13-16 | C₄H₉ | CH₃ | COOC₃H₇ | CO(CH₂)₄NCH₂CH₂OCH₂CH₂ |
| 13-17 | —SCH₃ | C₂H₅ | COOC₄H₉ | COCH₂NCH₂CH₂OCH₂CH₂ |
| 13-18 | —SC₂H₅ | C₃H₇ | CN | C₃H₇CO |
| 13-19 | —SC₃H₇ | C₄H₉ | CONH₂ | C₃H₇CO |
| 13-20 | —SC₄H₉ | H | COOCH₃ | COCH₂NCH₂CH₂OCH₂CH₂ |

What is claimed is:
1. A compound selected from those having the formula:

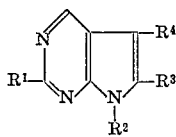

where:
R¹ is lower alkyl, phenyl, halophenyl, lower alkylphenyl, lower alkoxyphenyl, or lower alkylthio;
R² is hydrogen or lower alkyl;
R³ is cyano, carbamoyl, or lower alkoxycarbonyl;
R⁴ is amino or NHR' where R' is chloro(lower)alkylcarbonyl, bromo(lower)alkylcarbonyl, lower alkoxyethylamino(lower)alkylcarbonyl, lower alkoxypropylamino(lower)alkylcarbonyl, lower alkoxybutylamino(lower)alkylcarbonyl, morpholino(lower)alkylcarbonyl, lower alkyl or lower alkylamino.

2. A compound as defined in claim 1 which is: 5-amino-2-phenyl-7H-pyrrolo[2,3-d]pyrimidine-6-carboxylic acid, ethyl ester.

3. A compound as defined in claim 1 which is: 5-amino-2-phenyl-7H-pyrrolo[2,3-d]pyrimidine-6-carboxamide.

4. A compound as defined in claim 1 which is: 5-amino-7-methyl - 2 - phenyl-7H-pyrrolo[2,3-d]pyrimidine-6-carbonitrile.

5. A compound as defined in claim 1 which is: 5[2-(2-methoxyethylamino)acetamido]-7-methyl-2-phenyl-7H-pyrrolo[2,3-d]pyrimidine-6-carbonitrile.

6. A compound as defined in claim 1 which is: 5-(2-morpholinoacetamido)-2-phenyl-7H-pyrrolo[2,3-d]pyrimidine-6-carboxamide.

7. A compound as defined in claim 1 which is: N-(6-cyano-7-methyl-2-phenyl-7H-pyrrolo[2,3-d]pyrimidin-5-yl)-3-(2-methoxyethylamino)propionamide, hydrochloride.

8. A compound as defined in claim 1 which is: N-(6-cyano-7-methyl-2-phenyl-7H-pyrrolo[2,3-d]pyrimidin-5-yl)-4-morpholineacetamide.

References Cited
UNITED STATES PATENTS 3,037,980    6/1962    Hitchings et al. __ 260—256.4 F
3,296,261    1/1967    Partyka _____ 260—256.4 F ALEX MAZEL, Primary Examiner R. J. GALLAGHER, Assistant Examiner U.S. Cl. X.R.

260—247.1, 251 R, 256.4 F, 256.4 C, 256.4 N, 256.5 R; 424—248, 251

UNITED STATES PATENT OFFICE
CERTIFICATE OF CORRECTION

Patent No. 3,631,036  Dated December 28, 1971

Inventor(s) Dong H. Kim and Arthur A. Santilli

It is certified that error appears in the above-identified patent and that said Letters Patent are hereby corrected as shown below:

At column 2, line 20, Formula III should read as follows:

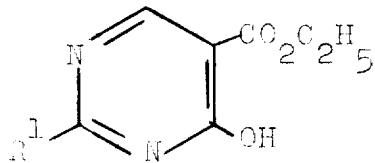

(III)

At column 6, line 46 "parenternally" should read -- parenterally --

At column 8, line 4 "absolution" should read -- absolute --

At column 16, line 53 "acetyle" should read -- acetyl --

Signed and sealed this 9th day of January 1973.

(SEAL)
Attest:

EDWARD M. FLETCHER, JR.
Attesting Officer

ROBERT GOTTSCHALK
Commissioner of Patents